United States Patent [19]

Barker et al.

[11] Patent Number: 4,815,029

[45] Date of Patent: Mar. 21, 1989

[54] IN-LINE DYNAMIC EDITOR FOR MIXED OBJECT DOCUMENTS

[75] Inventors: Barbara A. Barker, Round Rock; Irene H. Hernandez; Beverly H. Machart, both of Austin, all of Tex.

[73] Assignee: International Business Machines Corp., Armonk, N.Y.

[21] Appl. No.: 779,063

[22] Filed: Sep. 23, 1985

[51] Int. Cl.⁴ .......................... G06F 3/153; G06F 7/28
[52] U.S. Cl. ...................................... 364/900; 364/300
[58] Field of Search ... 364/200 MS File, 900 MS File, 364/300; 400/63; 340/709

[56] References Cited

U.S. PATENT DOCUMENTS

| | | | |
|---|---|---|---|
| Re. 32,632 | 3/1988 | Atkinson | 340/709 |
| 3,648,271 | 3/1972 | McConnell et al. | 364/300 |
| 4,451,900 | 5/1984 | Mayer et al. | 364/900 |
| 4,498,107 | 2/1985 | Yoshimaru et al. | 358/256 |
| 4,529,978 | 7/1985 | Rupp | 340/727 |
| 4,539,653 | 9/1985 | Bartlett et al. | 364/900 |
| 4,580,241 | 4/1986 | Kucera | 364/900 |
| 4,587,631 | 5/1986 | Nielsen et al. | 364/900 |
| 4,601,003 | 7/1986 | Yoneyama et al. | 364/518 |
| 4,642,790 | 2/1987 | Minshull et al. | 364/900 |
| 4,658,351 | 4/1987 | Teng | 364/200 |
| 4,674,042 | 6/1987 | Hernandez et al. | 364/900 |
| 4,686,522 | 8/1987 | Hernandez et al. | 340/709 |
| 4,688,167 | 8/1987 | Agarwal | 364/200 |
| 4,692,757 | 9/1987 | Tsuhara et al. | 340/721 |
| 4,698,624 | 10/1987 | Barker et al. | 340/709 |
| 4,717,971 | 1/1988 | Sawyer | 358/342 |

OTHER PUBLICATIONS

S. M. Wulff, "Workstations for Computer-Aided Publishing", Mini-Micro System, vol. 17, No. 3, Mar. 1984; pp. 217-221, 224-226.

"Grouping Concept", Research Disclosure, No. 206, Aug. 1985, New York, U.S.; p. 404, No. 25625.

B. A. Barker, "Controlling the Editing and Location of Like Objects in an Integrated Environment", IBM Technical Disclosure Bulletin, vol. 27, No. 5, Oct. 1984, p. 2955.

"Top-Down Development Using a Program Design Language", P. Van Leer, IBM Syst J, No. 2, 1976, pp. 155-170.

Primary Examiner—Raulfe B. Zache
Assistant Examiner—Danh Phung
Attorney, Agent, or Firm—C. Lamont Whitham; Michael E. Whitham

[57] ABSTRACT

A method for the intelligent, in-line, dynamic editing of documents containing mixed object types on a computer work station is disclosed. The mixed object types may be text objects, draw graphics objects, business graphics objects, and tables objects. The editor executes actions on use selected objects and attributes based on internal knowledge of the object type selected rather than by explicit user commands. This procedure provides a simple user interface that makes manipulation of objects and attributes and command execution transparent to the user.

5 Claims, 3 Drawing Sheets

Generic Commands

| | | | GET | UNDO/REDO | PRINT | PASTE | END |
|---|---|---|---|---|---|---|---|
| SHOW | CREATE | DESCRIBE | SEARCH | GOTO | DELETE | MOVE | COPY |

FIG. 2A

Text Commands

| MERGE | SPLIT | CONVERT | GET | UNDO/REDO | PRINT | PASTE | END |
|---|---|---|---|---|---|---|---|
| SHOW | CREATE | DESCRIBE | SEARCH | GOTO | DELETE | MOVE | COPY |

FIG. 2B

Draw Graphics Commands

| ROTATE | SHAPE | SMOOTH | GET | UNDO/REDO | PRINT | PASTE | END |
|---|---|---|---|---|---|---|---|
| SHOW | CREATE | DESCRIBE | SEARCH | GOTO | DELETE | MOVE | COPY |

FIG. 2C

Business Graphics Commands

| ROTATE | SHAPE | CONVERT | GET | UNDO/REDO | PRINT | PASTE | END |
|---|---|---|---|---|---|---|---|
| SHOW | CREATE | DESCRIBE | SEARCH | GOTO | DELETE | MOVE | COPY |

FIG. 2D

Tables Commands

| CLEAR | VIEW | SORT | GET | UNDO/REDO | PRINT | PASTE | END |
|---|---|---|---|---|---|---|---|
| SHOW | CREATE | DESCRIBE | SEARCH | GOTO | DELETE | MOVE | COPY |

FIG. 2E

IN-LINE DYNAMIC EDITOR FOR MIXED OBJECT DOCUMENTS

CROSS REFERENCE TO RELATED APPLICATIONS

The invention disclosed in this application is related to the inventions disclosed in the following patent applications which are assigned to the assignee of this application:

Ser. No. 06/645,622 filed Aug. 30, 1984, by Barbara A. Barker and Rex A. McCaskill for "Superblock Structure in a Multiple Data Editor" now U.S. Pat. No. 4,723,210; and Ser. No. 06/645,630 filed Aug. 30, 1984, by Barbara A. Barker, Irene H. Hernandez and Rex A. McCaskill for "Editing of a Superblock Structure" now U.S. Pat. No. 4,723,211.

The disclosures of the foregoing applications are incorporated herein by reference.

FIELD OF THE INVENTION

This invention generally relates to integrated multiple data editors and, more particularly, to the intelligent, in-line, dynamic editing of documents containing mixed object types.

DESCRIPTION OF THE PRIOR ART

The trend in computer programs today is to provide some form of integration of various program applications. Without integration, the user must employ separate application programs for word processing, data processing and graphic applications. When separate application programs are used for these various functions, it is often difficult to merge the outputs of the several applications into a single document. Therefore, the purpose of program application integration is to simplify the use of a computer to produce a desired output product.

The simplest form of integration is a series of application programs designed to work alike sharing the same files and using the same or similar commands to perform the same or similar functions. This form of integration is relatively easy to implement but does not allow the individual programs of the family to be run simultaneously. Currently, the most popular integrated software are what may be termed multiple-function programs. These are characterized as incorporating a variety of applications within one program. Such programs generally allow splitting of the screen into several different windows almost as if each were a separate program. Typically, these multiple-function programs include text, spreadsheet and business graphing applications. Somewhat similar to the multiple-function programs is the integration technique based on a database application environment wherein all applications share a common set of data. Quite a different approach is taken when an integrated operating environment is provided. In this approach, individual programs can share information and often appear on the screen at the same time, each in its own window. Applications can be chosen and combined in contrast to multiple-function programs that are limited to applications programmed into the package.

As part of a research effort at the IBM Cambridge Scientific Center in Cambridge, Mass., to develop software techniques in the field of office systems, Sheldon Borkin and John Prager developed the personal on-line integrated text editor (POLITE). This is an easy-to-use, real-time editor and formatter for compound documents. A compound document is one containing images, draw graphics, charts, handwriting, text, tables and mathematical symbols. The philosophy of Polite is the idea that an editor should be able to handle integration of functions in-line without having to invoke separate applications and without using a cut and paste buffer. The Apple Lisa and Macintosh and the Xerox Star computers are all integrated systems offering the capability to edit compound documents, but the method commonly used in those computers is to place the result of the requested function in a cut buffer and then to return to the document editor to paste the result in the desired location. This is a time-consuming and tedious process.

Although Polite provides function integration from within a single application, the editing environment is controlled by explicit user actions. The user must display the menu that applies to an object before an applicable action can be selected, or must type the action on the command line after selecting the object.

The inventions disclosed in the above-referenced co-pending patent applications Ser. No. 06/645,622 filed by Barbara A. Barker and Rex A. McCaskill and Ser. No. 06/645,630 filed by Barbara A. Barker, Irene H. Hernandez and Rex A. McCaskill are directed to improvements in an application composite editor which is based on the Polite system. Like Polite, the application composite editor is an easy-to-use, real-time editor formatter for compound documents containing not only text but also, images, graphics, tables, annotations and handwriting. The application composite editor provides integration of all data on a single page in relation to each other in dynamic editable form. All data types can be created within the same document, and text can flow around graphics and tables. All data in the editor resides on pages and all pages reside within a composite document. The editor works with a page layout philosophy wherein data objects reside on the page and data resides in the data objects. All pages reside within a document object, and some data objects may have additional objects within them. Objects are data-specific entities that the user can manipulate on the page. The objects that are within other objects reside within a defined object set boundary. All objects are explicit; i.e., they are recognizable, chooseable entities. All objects exist within a specified boundary on the page. This boundary is defined as an object set boundary. For example, a text character exists within the boundary of either a line object set or a paragraph object set; a rectangle exists within the boundary of a graphic object set; and a cell exists within the boundaries of a table object set.

A major difference between this invention and the Polite editor is that the editing environment is controlled by the editor and not the user. The editor determines what commands to display based on the object type selected and/or the current location of the cursor used to select objects and actions. The user does not explicitly request that commands be displayed. The editor manages each document page as an area occupied by object sets that can contain text, graphic, image or tabular data, and that can have a relationship with any of the other object sets on the page, on another page in the document or external to the document.

SUMMARY OF THE INVENTION

It is an object of the present invention to provide a mixed object editor that executes actions on objects and attributes based on internal knowledge of the object type and environment rather than by explicit user commands.

It is another object of this invention to provide a simple user interface that makes manipulation of objects and attributes and command execution transparent to the user.

It is a further object of the invention to provide a method of editing all objects in-line on the page and not in separate windows or via an input line.

It is yet another object of the invention to provide a generic method of editing mixed objects within a document that does not require a separate application load or specifying an explicit command.

According to the invention, the application composite editor described above consists of a controller that handles dialog with the user and multiple data/action specific subroutines through which the controller directs the manipulation of objects and routes the execution of commands. The controller monitors user input, displays all menus and messages, and handles all generic functions such as document formatting, object positioning, simple text editing, move, copy, delete, search/replace, go to, get, create, and display of status, scale and command lines. The method of editing objects is the same no matter what type of object is selected. The user selects the object and then specifies an action to be applied to the object. For example, text is inserted in a paragraph by selecting the paragraph object and then keying in text starting at the cursor location. Headers and footers are updated in a like manner; i.e., the header or footer object is selected and changes are indicated starting at the cursor location. Changes do not need to be specified in a separate edit window as required by many word processors, nor on the command line as required by Polite.

The editor provides a menu containing a generic set of commands that are valid for any object type. These commands include get, undo/redo, create, describe, search, go to, delete, move and copy. Whenever an object is selected, the editor displays object specific commands in addition to the generic commands being displayed. For example, if a graphic object is selected, rotate, shape and smooth are displayed concurrently with the generic commands. But, if a table object is selected, rotate, shape and smooth are replaced by clear, view and sort. Selection of the object is the trigger that makes the editor automatically change the set of commands that are to be displayed. The user does not have to explicitly tell the editor to change from one set to the next.

The controller uses the specified object and action to determine what processing is necessary and calls the appropriate subroutine automatically on an as needed basis. This operation is completely transparent to the user. Because of this design, the user never has to worry about different object types and the processes required for the merging of data on a page. Tables can be next to graphics and graphics next to text with no diminishing of flexibility.

BRIEF DESCRIPTION OF THE DRAWINGS

The invention will be better understood from the following detailed description of a preferred embodiment of the invention with reference to the drawings, in which:

FIGS. 2A to 2E illustrate the generic commands valid for each edit object, and the commands valid for each specific object type.

DESCRIPTION OF THE PREFERRED EMBODIMENT

Figure 1:
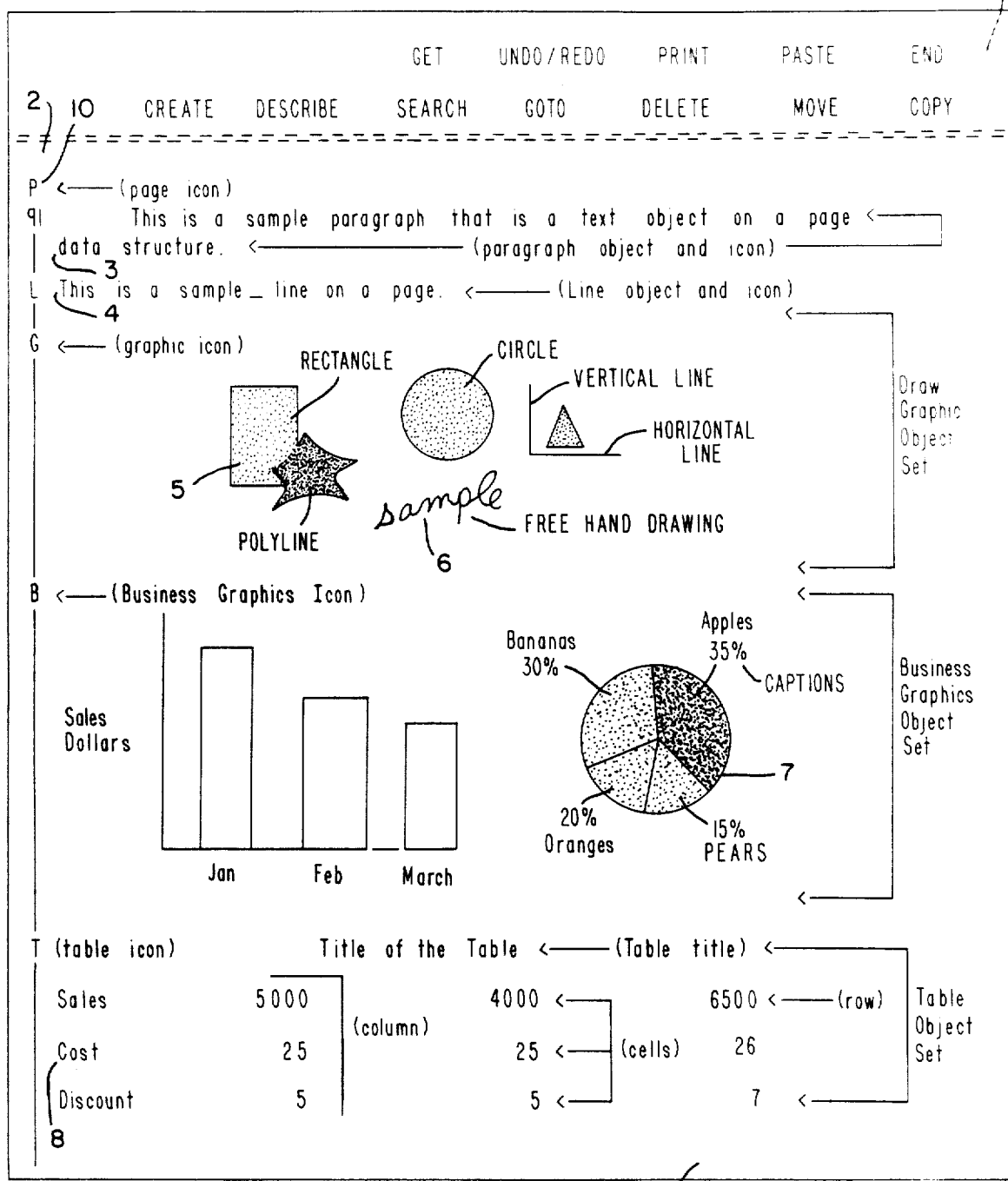
FIG. 1 illustrates a sample page from a mixed object document.

For a more detailed understanding of the invention, reference is first made to FIG. 1 of the drawings. In this figure, there is shown a document page 2 which it is assumed is being displayed in an edit window 1 on an all points addressable (APA) or bit mapped display device controlled by a stand alone or host connected computer work station. A user request to edit the document containing page 2 causes the page to be presented in edit window 1. Indicated on page 2 are a paragraph 3 and a line 4, examples of text objects, a rectangle 5 and free hand drawing 6, examples of draw graphic objects, a pie chart 7, an example of a business graphics object, and a spreadsheet 8, an example of a table object. Command bar 9 shows the generic commands valid for any object on page 2. At this point, the user can select any command on command bar 9 or any object on page 2 including icon 10 which represents the page 2 object.

FIGS. 2A, 2B, 2C, 2D, and 2E show the commands valid for each of the object types supported by the editor. Command bar 11 in FIG. 2A contains the commands common to all document objects. Command bar 12 in FIG. 2B contains the generic commands plus the text object specific commands MERGE, SPLIT and CONVERT. The draw graphic object specific commands ROTATE, SHAPE and SMOOTH are shown with the generic commands in command bar 13 in FIG. 2C. ROTATE, SHAPE and CONVERT, the business graphic object specific commands, have been added to the generic commands in command bar 14 in FIG. 2D, and command bar 15 in FIG. 2E contains the table object specific commands CLEAR, VIEW and SORT. The system automatically displays one of the object specific command bars whenever the object type is selected for editing. For example, selection of rectangle 5 in FIG. 1 will cause the system to display command bar 13, and selection of paragraph 3 or line 4 will cause command bar 12 to be displayed. The system always knows the type of the selected object and the commands that must be displayed for editing the object.

Figure 3:
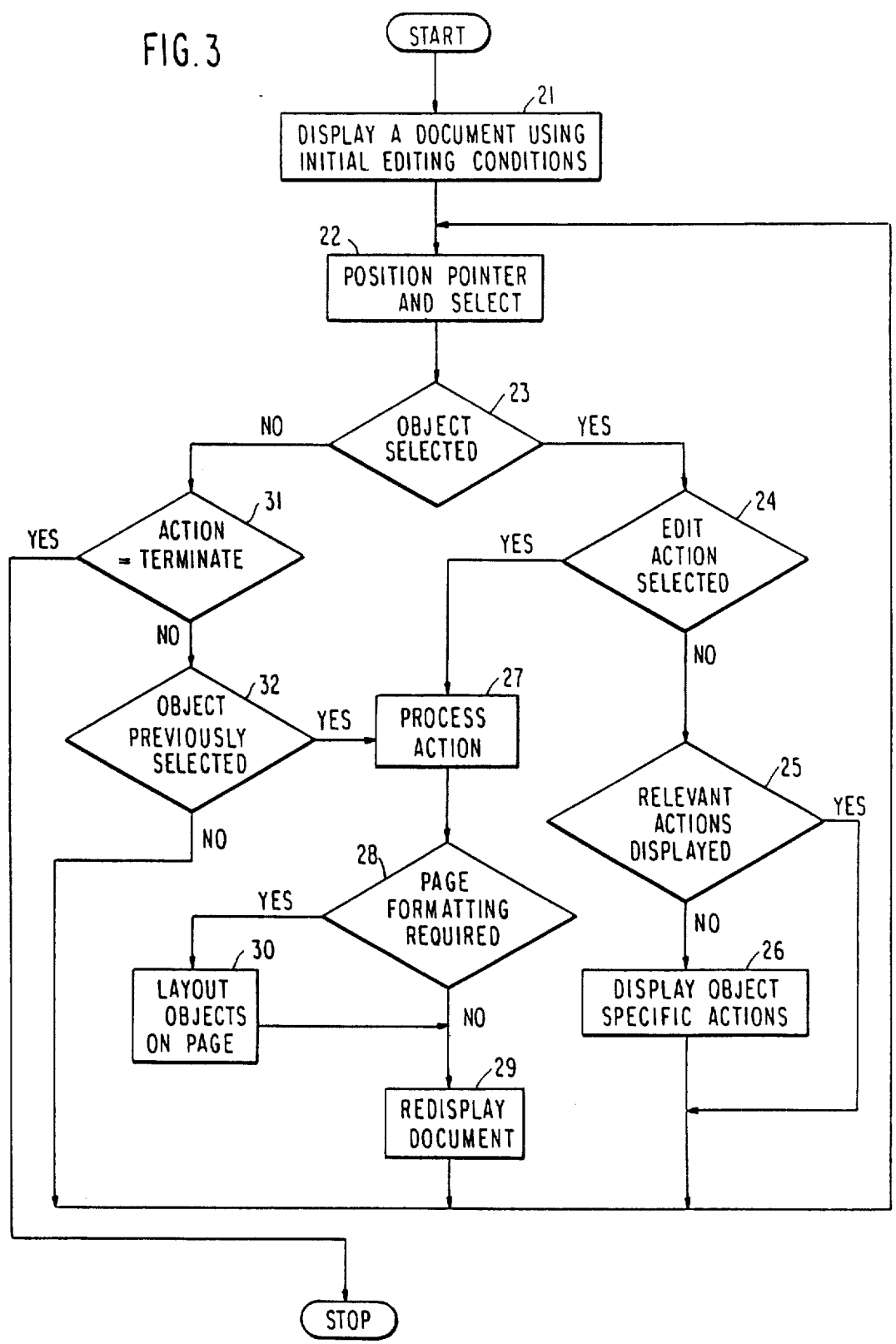
FIG. 3 is a flow chart showing the operation of the invention.

Reference is next made to the flow chart shown in FIG. 3 which illustrates the process of editing a mixed object document. First, the operator indicates that a document is to be edited. The system then displays the commands valid for editing the document and the first page of the document, if the document already exists, or a blank page, if the document is to be created. At this point, the operator can position the pointer at any location within the edit window, and select either a command or an object. This action is depicted in blocks 21 and 22. If an object has been selected, the flow of control is through block 23 to block 24; if the selection is an edit command, control passes to block 31. In block 24, the system checks to see if an edit action had been selected prior to selecting an object. If an action has been selected, the system processes the action in block 27. After processing the edit action, the system checks in block 28 to see if the document page needs to be reformatted. Reformatting of the page and layout of the objects on the page occurs in block 30. In block 29, the document is redisplayed in the edit window, and control returns to block 22.

At block 24, if an edit action has not been selected, control passes to block 25 where the system checks to see if the commands being displayed are valid for the object selected. If the commands are not valid, the system automatically displays the command bar that contains the actions specific to the selected object. After displaying the valid command bar, control returns to block 22.

If an edit action has been selected, the system checks in block 31 to see if the action is to terminate document editing. If the action is not a terminating action, control flows to block 32. At block 32, the system checks to see if an object had been selected prior to selecting the action. If an object has been selected, the system processes the action in block 27, tests for reformatting in block 28, reformats in block 30 and rediplays the document in block 29. Next, control returns to block 22. If an object has not been selected, control also returns to block 22 to wait for the operator to make a selection.

Set out below is an illustration of an application program useable by a processor in the workstation or host implementing an intelligent dynamic editor and formatter of a document containing mixed data types. This program is in program design language (PDL) from which source and machine code are derivable. In the following, it is to be assumed that the operator has initiated an action requiring the system to provide a document editing environment that includes a set of editing objects with distinctive properties and a set of actions that can be applied to the objects and properties.

```
(*Document has been displayed according to the
initial edit state defined by the operator.*)
REPEAT
   CALL GET_PTR_POS(I_LOC, I_SEL)
   IF AN EDIT OBJECT HAS BEEN SELECTED
      THEN IF AN EDIT ACTION HAS PREVIOUSLY BEEN
         SELECTED
         THEN CALL EXECUTECMD(CMD_TYPE, OBJ_TYPE)
            IF REFORMATTING OF PAGE REQUIRED
               THEN CALL FORMAT_PAGE
            ENDIF
            CALL REDISPLAY
         ELSE CALL CHECK_CMDS(OBJ_TYPE, CMDS_OKAY)
            IF NOT CMDS_OKAY
               THEN CALL DISPLAY_CMDS(OBJ_TYPE)
            ENDIF
         ENDIF
      ELSE (*EDIT ACTION SELECTED*)
         IF EDIT ACTION <> TERMINATE
            THEN IF AN EDIT OBJECT HAS PREVIOUSLY
               BEEN
               SELECTED
               THEN CALL EXECUTECMD(CMD_TYPE,
                  OBJ_TYPE)
                  IF REFORMATTING OF PAGE REQUIRED
                     THEN CALL FORMAT_PAGE
                  ENDIF
                  CALL REDISPLAY
               ENDIF
         ENDIF
   ENDIF
UNTIL CMD_TYPE = TERMINATE
```

After the operator indicates that an editing session is to begin, the document to be edited is displayed according to the initial edit state conditions. The first page of the document is positioned within an edit window on the display screen. A menu consisting of generic commands such as create, delete, move, copy and the like is also shown. At this point, the operator can select any object in the document such as a page header or footer, a text paragraph, or a graphic picture or any command.

Next, the system begins to monitor operator input. A routine is called to get the position of the pointer and to determine if an object or a command has been selected (CALL GET_PTR_POS(I_LOC, I_SEL)). The parameter I_LOC gives the x,y position of the pointing device, and the parameter I_SEL specifies if an object or a command has been selected. The editor correlates a cursor location to an area within the window which in turn can be correlated to an edit object. The system treats menu entries as objects unless the entry is a command.

If an object is selected and a command has previously been chosen, then a routine is called to process the action on the object (CALL EXECUTECMD(CMD_TYPE, OBJ_TYPE)). The command type (CMD_TYPE) and the object type (OBJ_TYPE) provide information to the routine that can be used to determine if additional object specific routines must be called to complete execution of the command. After processing of the command is finished, the editor determines if any document page needs to be reformatted and automatically calls the routine to format the page (CALL FORMAT_PAGE). Next, a routine is called to update and redisplay the contents of the document window (CALL REDISPLAY). The FORMAT_PAGE routine positions each object on the page according to the object type, the formatting properties and any existing relationships. If a command has not previously been selected, then a routine is called to verify that the commands being displayed are relevant to the object type (OBJ_TYPE) selected (CALL CHECK_CMDS(OBJ_TYPE, CMDS_OKAY)). The flag CMDS_OKAY is used to determine if a routine needs to be called to determine the valid commands for the object type selected and to display the commands in the edit window (CALL DISPLAY_CMDS(OBJ_TYPE)). The system continues to monitor operator input until a command or another object is selected.

If a non-terminating command is selected and an object has previously been chosen, then the EXECUTECMD routine is called to process the action on the object. FORMAT_PAGE and REDISPLAY are automatically called as needed. If an object has not already been selected, the system continues to monitor operator input until further processing is required. The edit session is concluded when a terminating command such as QUIT or END is selected.

While the invention has been described by way of example to a single preferred embodiment, those skilled in the art will understand that modifications can be made without departing from the spirit and scope of the invention.

Having thus described our invention, what we claim as new and desire to secure by Letters Patent is set forth below:

1. A method for the intelligent, in-line, dynamic editing of documents containing mixed object types on a computer work station comprising the steps of:
   (a) displaying a document and a command bar on the computer work station, said command bar containing at least generic actions which may be chosen by a user in the editing of the document;

(b) determining if an object on the document has been selected by the user for editing;

(c) determining the type of object selected by the user for editing; and (d) displaying in said command bar editing actions which are specific to the type of object selected by the user for editing.

2. The method recited in claim 1 further comprising the steps of:

(e) determining if an edit action has been selected by the user for editing a selected object;

(f) processing the edit action selected by the user for the selected object and automatically reformatting the document as required; and (g) redisplaying the document as edited and reformatted.

3. The method recited in claim 2 further comprising the steps of:

(h) determining if the user has selected a terminating action; and (i) ending the editing of the document when the terminating action is selected.

4. The method recited in claim 1 wherein said mixed object types may be text objects, draw graphics objects, business graphics objects, and tables objects, said step of displaying in said command bar editing actions which are specific to the type of object selected by the user for editing comprising any one of the steps of:

displaying text commands in said command bar if a text object is selected; or displaying draw graphics commands in said command bar if a draw graphics object is selected; or displaying business graphics commands in said command bar if a business graphics object is selected; or displaying tables commands in said command bar if a table object is selected.

5. The method recited in claim 4 wherein said step of displaying in said command bar editing actions which are specific to the type of object selected by the user for editing includes displaying both said generic actions and the specific actions simultaneously in the command bar.

* * * * *